Sept. 26, 1939.   W. M. WILLETT   2,174,050

THERMAL ELECTRIC CONTROL DEVICE

Filed Dec. 4, 1936

INVENTOR
William M. Willett
BY A. S. Kroth
ATTORNEY

Patented Sept. 26, 1939

2,174,050

UNITED STATES PATENT OFFICE 2,174,050

THERMAL ELECTRIC CONTROL DEVICE

William M. Willett, Fort Atkinson, Wis., assignor to James Manufacturing Company, Fort Atkinson, Wis.

Application December 4, 1936, Serial No. 114,189

2 Claims. (Cl. 200—140)

My invention relates to improvements in thermal means for controlling electric motors used for driving ventilating fans and for thermally controlled devices and for other purposes.

An object of the present invention is to provide a novel container or supporting box on or in which may be mounted a thermal device, various controlling switches and a pilot light.

An important feature of my invention is the thermal device and the switch operated thereby, each having novel means for making adjustments whereby they will be caused to cooperate to accurately maintain the desired temperature.

Other novel features of my invention are the elimination of friction in the moving parts of the device and the use of a spring which yieldingly holds the intermittently contacting parts together thus to protect the parts against breakage if the temperature should rise abnormally.

To these and other useful ends my invention consists of parts and combinations thereof or their equivalents as hereinafter set forth and claimed and shown in the accompanying drawing in which:

As thus illustrated A designates the container box for the various controlling parts. B designates in its entirety, the thermal device which is preferably an expandable container, having therein a thermally sensitive liquid and a suitable snap switch controlled thereby. C designates in its entirety, the pilot light. D designates in its entirety, the line switch and E designates in its entirety, the switch used for throwing out the thermal control and throwing in the direct control and pilot light. F designates in its entirety, the regulating means whereby the device is set for maintaining the desired temperature.

It will be understood that motor G may be used for various purposes when an on-and-off thermal control is desired; or it may be found desirable to use my device for controlling any form of on-an-off cooling or heating system. In other words, my invention is adaptable to numerous uses and is valuable wherever a simple self-contained thermal control is wanted.

Clearly applicant's thermal device B may be made to operate either a one or two point switch, and switches D and E may be used to control any electric mechanism or electric circuits.

Figure 1:
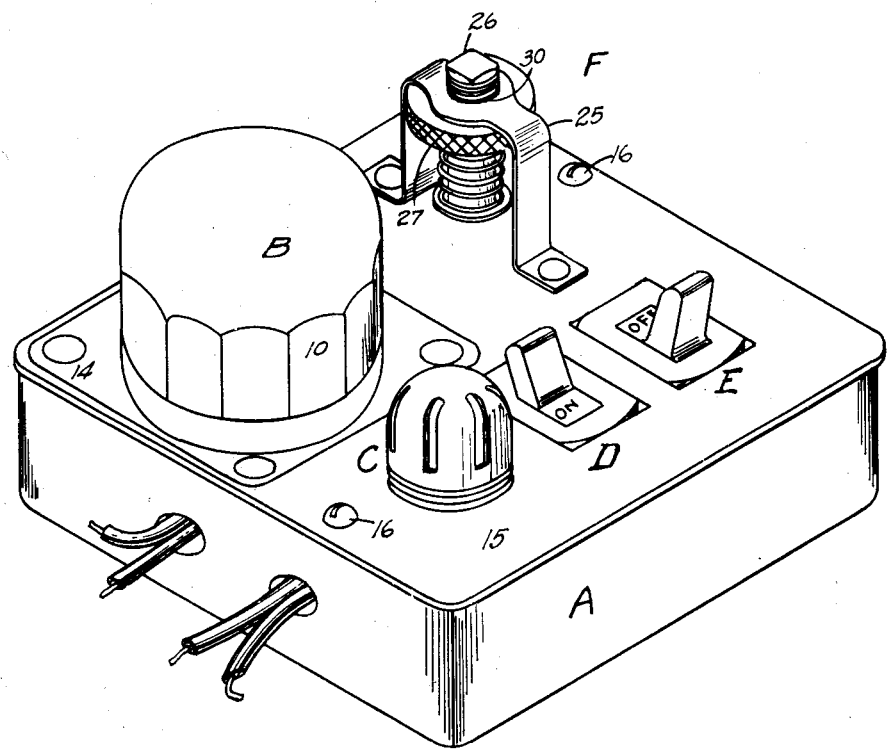
Fig. 1 is a perspective view of my improved control box.
Figure 2:
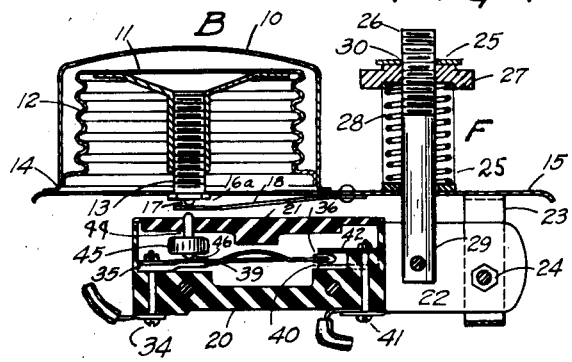
Fig. 2 is a sectional view of the thermal control and switch, also illustrating partially in section, the means for regulating the same, the switch being sectioned on lines 2—2 of Figure 3.
Figure 3:
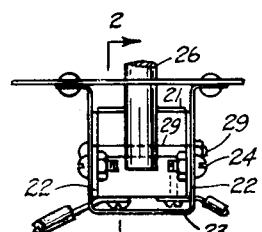
Fig. 3 is a rear end view of the switch illustrated in Figure 2.
Figure 4:
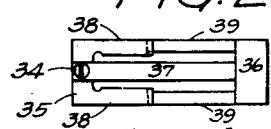
Fig. 4 is a top view of the switch springs and their elements.

In Figure 2 I illustrate in detail the thermal unit and electric switch controlled thereby, wherein 10 designates the outer chamber and 11 the inner chamber of the thermal unit. The inner chamber is circular and has a corrugated wall as at 12 whereby the changing pressure within the container will cause the screw threaded member 13 to move back and forth in response to the temperature to which the device is exposed. Outer chamber 10 is provided with an outwardly extending flange 14 for securement to the lid 15 of box A. All of the parts in the box are preferably secured to this lid and the lid is secured to the box by means of bolts 16; thus the entire mechanism may be easily removed for inspection by removing the lid.

I provide a hexagonal member 16ª on the free end of member 13 and a knob 17 which engages spring 18 whereby member 13 may be adjusted to a point where the spring acts against the expansion of the thermal unit to a desired extent.

The switch which is operated by the thermal unit is novel in that it consists of a unitary assembly and comprises preferably an insulating base 20 having a lid 21. I secure two flat rearwardly extending members 22—22 to the sides of members 20 and 21 by means of suitable bolts. A U-shaped bracket 23 acts as a pivotal support for the switch as at 24. I provide a positioning or adjusting means for the switch, comprising a bracket 25, a screw threaded bolt 26, a nut 27 and a spring 28, each positioned as illustrated. Member 26 has a pivotal connection to members 22 as at 29, member 26 extending through an opening in bracket 25 as at 30; thus by turning nut 27, the switch unit may be rocked on its pivot 24 to a desired position.

I provide a spring base 35 which is securely held to a ledge on member 20 by means of bolt 34, which also answers as a binding post for one of the wires as indicated. A contact bar 36 is secured to the free end of spring 37, this spring being secured to base 35 by means of bolt 34. Base 35 has two spaced extensions 38—38, their ends being recessed for the reception of the rear ends of springs 39—39 each of which is secured to bar 36.

Figure 5:
Fig. 5 is a side view of the device shown in Figure 4.

These springs are of a length to be under tension when their ends rest in the groove at the free ends of members 38, as clearly indicated in Figure 5. I provide a contact plate 42 which is secured to a ledge on member 20 by means of bolt 41 which bolt acts as a binding post for another wire.

Plate 40 is spaced a distance from plate 42 allowing a desired movement for contact bar 36. Springs 37 and 39 are shaped and of a length whereby bar 36 will normally be pressed against plate 42 thus closing the circuit between bolts 34 and 41. I provide a pin 44 on the end of which I secure member 45, having a projecting knob 46. The pin 44 protrudes through an orifice in lid 21 and registers with knob 17. Knob 46 rests on spring 37 near its secured end, the springs being shaped whereby a certain pressure on rod 44 will cause plate 36 to snap against plate 40, thus opening the circuit; thus it will be seen that by turning nut 27, pin 44 may be caused to contact spring 18 at any desired temperature, whereby an additional expansion of the thermal device will cause knob 46 to press upon spring 37 and cause the circuit to be opened in the manner described; and when the temperature falls sufficiently, the pressure on knob 46 will be reduced and the switch will be permitted to close again.

Therefore the circuit will be opened or closed in response to temperature changes. It will be observed that spring 28 will yield to excessive pressure on rod 44; thus an unusual rise in temperature after the switch is opened, will not injure the device because the switch will be permitted to move downward by spring 28.

Clearly any other form of toggle or snap switch may be used on my device and plate 40 may be used as a connection instead of plate 42 as shown, so as to close the circuit in response to a rising temperature and open it in response to a lowering temperature.

Thus it will be seen that my device is simple and neat and can be manufactured at low cost and be easily installed, and that the adjustments are simple and easily understood.

It will be understood that various changes in details of construction may be made without departing from the spirit and scope of the invention and therefore I do not wish to be limited to the specific details above described.

I claim:

1. A thermally controlled electric switch of the class described, comprising an open end chamber and a similarly positioned open end Sylphon positioned therein and having their edges secured together to thereby form an inclosure for the reception of a thermally sensitive liquid, a centrally positioned post secured to the inner side of the head of said Sylphon and having a bolt screw threaded therein, the free end being reduced in size, a flat spring positioned whereby its free end rests on the reduced end of said bolt whereby said bolt may be adjusted to change the pressure of said spring against the action of said Sylphon, a unitary switch pivotally mounted at one end and having an operating member at the other end adapted to contact said spring on the opposite side of and adjacent the reduced end of said bolt whereby the action of said Sylphon may close and open said switch, adjustable means for rocking said switch on said pivot whereby the temperature at which said switch is operated may be manually adjusted.

2. A thermally controlled electric switch comprising in combination, a thermally sensitive unit having an operating member, a flat spring adapted to contact said operating member and exert a constant pressure thereon, means for manually adjusting said flat spring pressure, a unitary switch pivotally mounted at one end and having an operating projection at the other end adapted to be contacted by said flat spring on the opposite side of and adjacent said operating member to thereby open and close said switch, adjustable means for rocking said switch on said pivot whereby said operating projection may be manually positioned to thereby cause said switch to operate at any predetermined temperature, means on said adjustable means adapted to cause said operating projection to yieldingly contact said flat spring when subjected to abnormal pressure.

WILLIAM M. WILLETT.